(12) United States Patent
Hayafuji et al.

(10) Patent No.: US 6,789,595 B2
(45) Date of Patent: Sep. 14, 2004

(54) SUBSTRATES LAMINATING APPARATUS AND METHOD

(75) Inventors: Ikuo Hayafuji, Yokohama (JP); Shinichi Ogimoto, Sagamihara (JP)

(73) Assignee: Shibaura Mechatronics Corporation, Yokohama (JP)

( * ) Notice: Subject to any disclaimer, the term of this patent is extended or adjusted under 35 U.S.C. 154(b) by 0 days.

(21) Appl. No.: 10/385,856

(22) Filed: Mar. 12, 2003

(65) Prior Publication Data

US 2003/0205333 A1 Nov. 6, 2003

(30) Foreign Application Priority Data

Mar. 14, 2002 (JP) .................................... P2002-069378

(51) Int. Cl.[7] ............................................. B28B 31/00
(52) U.S. Cl. ...................... 156/580; 156/382; 156/228; 156/288
(58) Field of Search ............................... 156/580, 381, 156/382, 99, 106

(56) References Cited

U.S. PATENT DOCUMENTS

| | | | | |
|---|---|---|---|---|
| 4,638,731 A | * | 1/1987 | Kato | 100/282 |
| 5,766,407 A | * | 6/1998 | Miwa et al. | 156/382 |
| 6,003,579 A | * | 12/1999 | Parrish | 156/498 |
| 6,092,578 A | * | 7/2000 | Machida et al. | 156/358 |

* cited by examiner

*Primary Examiner*—Richard Crispino
*Assistant Examiner*—Michelle Acevedo Lazor
(74) *Attorney, Agent, or Firm*—Oblon, Spivak, McClelland, Maier & Neustadt, P.C.

(57) ABSTRACT

At least when an upper glass substrate 3 held by an upper retention head 10 and a lower glass substrate 4 held by a lower retention head 11 are abutted on each other through a sealing material 5, air cylinders 25, 25 apply a lifting force balancing with a dead weight of the upper retention head 10 to the upper retention head 10 to cancel its dead weight. In this state, the upper glass substrate 3 and the lower glass substrate 4 are abutted on each other through the sealing material 5.

8 Claims, 7 Drawing Sheets

SUBSTRATES LAMINATING APPARATUS AND METHOD

BACKGROUND OF THE INVENTION

1. Field of the Invention

The present invention relates to a substrates laminating apparatus and a method, which stick upper and lower substrates disposed to face each other by use of an adhesive.

2. Description of the Related Art

In manufacturing of a liquid crystal panel, laminating of two glass substrates is carried out in a vacuum state through a sealing material which is an adhesive.

Now, a conventionally known laminating process and an apparatus used for the process will be described.

FIGS. 1 to 4 are conceptual diagrams showing the conventional laminating process. First, as shown in FIG. 1, an upper glass substrate 3 and a lower glass substrate 4 are respectively fed to an upper retention head 1 and a lower retention head 2. The upper glass substrate 3 and the lower glass substrate 4 are retained.

The upper retention head 1 is constituted to be movable in X–Y–θ directions and upper and lower directions. The upper retention head 1 and the lower retention head 2 are disposed entirely in a vacuum chamber including a drive unit thereof. Atmospheric pressure is set at this time.

Thus, when the upper glass substrate 3 and the lower glass substrate 4 are respectively fed to the upper retention head 1 and the lower retention head 2, the vacuum chamber is evacuated.

Then, as shown in FIG. 2, supply pressure to an air cylinder for suspending and supporting the upper retention head 1 is stopped to lower the upper retention head 1 by its dead weight, and the upper glass substrate 3 is abutted on the lower glass substrate 4 through a sealing material 5. Subsequently, compressed air of preset pressure is supplied to the air cylinder, a lifting force is applied to the upper retention head 1, and the upper glass substrate 3 and the lower glass substrate 4 are pressed to each other by a predetermined pressing force based on a difference between the dead weight of the upper retention head 1 and the lifting force of the air cylinder. Prior to the lowering of the upper retention head 1, a state of deviation in relative positions between the glass substrates is detected by use of a camera or the like. When necessary, the upper retention head 1 is moved in X–Y directions or a θ direction to correct the state of deviation.

On an upper surface of the lower glass substrate 4, as shown in FIG. 4, a sealing material 5 is applied beforehand in a closed loop shape along a substrate edge. This sealing material 5 serves as a weir to prevent a flowing-out of a liquid crystal 6 dripped onto the lower glass substrate 4. Thus, by the pressing of the upper glass substrate 3, the two glass substrates 3, 4 are laminated together through the sealing material 5, and the liquid crystal is sealed between the glass substrates.

Then, the vacuum state in the vacuum chamber is released to return to the atmospheric state, the retentions by the upper retention head 1 and the lower retention head 2 are released, and the upper retention head 1 is raised as shown in FIG. 3. The glass substrates which have been laminated together are discharged out of the laminating apparatus.

With enlargement of liquid crystal panels in recent years, the glass substrates 3, 4 treated by the laminating apparatus also tend to be enlarged. Therefore, the upper and lower retention heads 1, 2 for holding the glass substrates 3, 4 must accordingly be enlarged, and the following problem is likely to occur.

That is, the enlarged retention heads 1, 2 are also increased in weight. In the laminating of the glass substrates 3, 4, if the heavy upper retention head 1 is lowered, a pressing force more than necessary is applied on the glass substrates 3, 4 by the dead weight of the upper retention head 1 when the upper glass substrate 3 and the lower glass substrate 4 are abutted on each other, thus an impact fore thereby causes damages to the glass substrates 3, 4.

SUMMARY OF THE INVENTION

Objects of the present invention are to provide an apparatus and a method for laminating substrates, which can improve yield by reducing an impact force applied to an upper substrate and a lower substrate to prevent damages of the substrates when substrates are laminated.

According to the present invention, there is provided a substrate laminating apparatus including: an upper retention head for holding an upper substrate; a lower retention head which holds a lower substrate and is disposed while facing the upper retention head, the upper and lower retention heads laminating the upper and lower substrates so as to interpose adhesive therebetween, which are respectively held by the lower and upper retention heads, by allowing the lower and upper retention heads to be close to each other relatively; an elevating apparatus for relatively moving the upper retention head and the lower retention head in upper and lower directions; and a lifting force application apparatus for applying a lifting force to at least one of the upper retention head and the lower retention head at least when the upper substrate held by the upper retention head and the lower substrate held by the lower retention head are abutted each other through the adhesive by the elevating device.

DETAILED DESCRIPTION OF THE PREFERRED EMBODIMENT

Next, the preferred embodiment of the present invention will be described.

Figure 1:
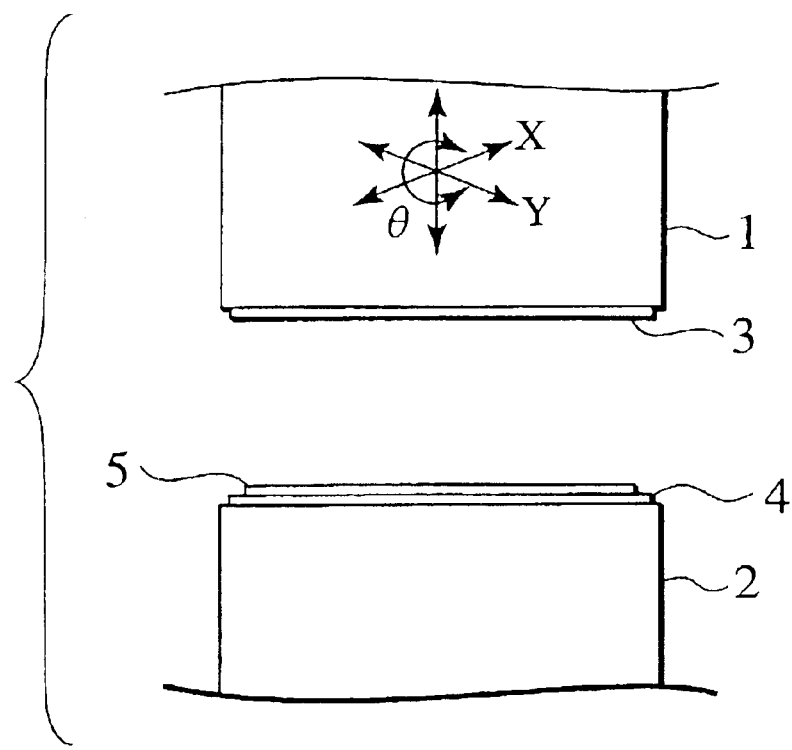
FIG. 1 is a conceptual diagram showing a conventional laminating process.
Figure 2:
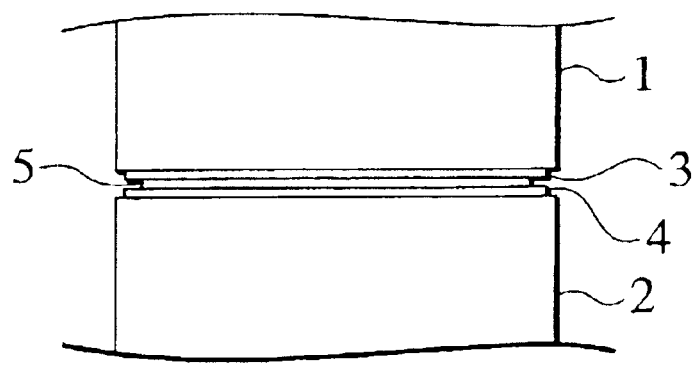
FIG. 2 is a conceptual diagram showing the conventional laminating process.
Figure 3:
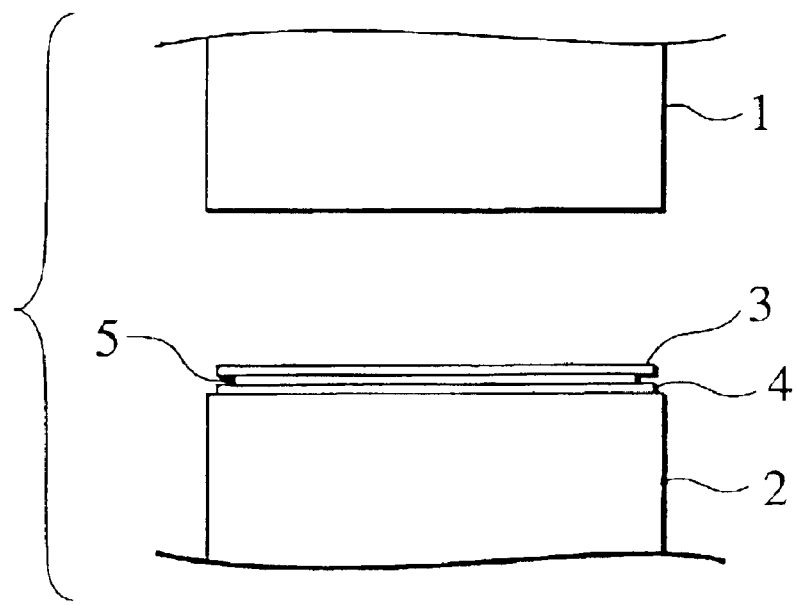
FIG. 3 is a conceptual diagram showing the conventional laminating process.
Figure 4:
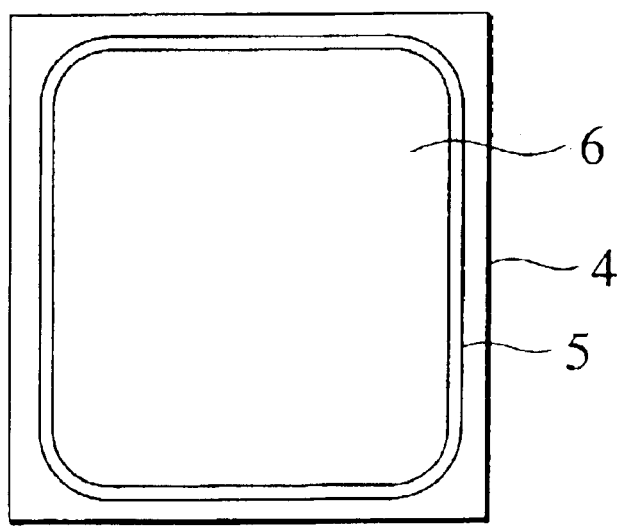
FIG. 4 is a plan view showing an applied state of a sealing material.
Figure 5:
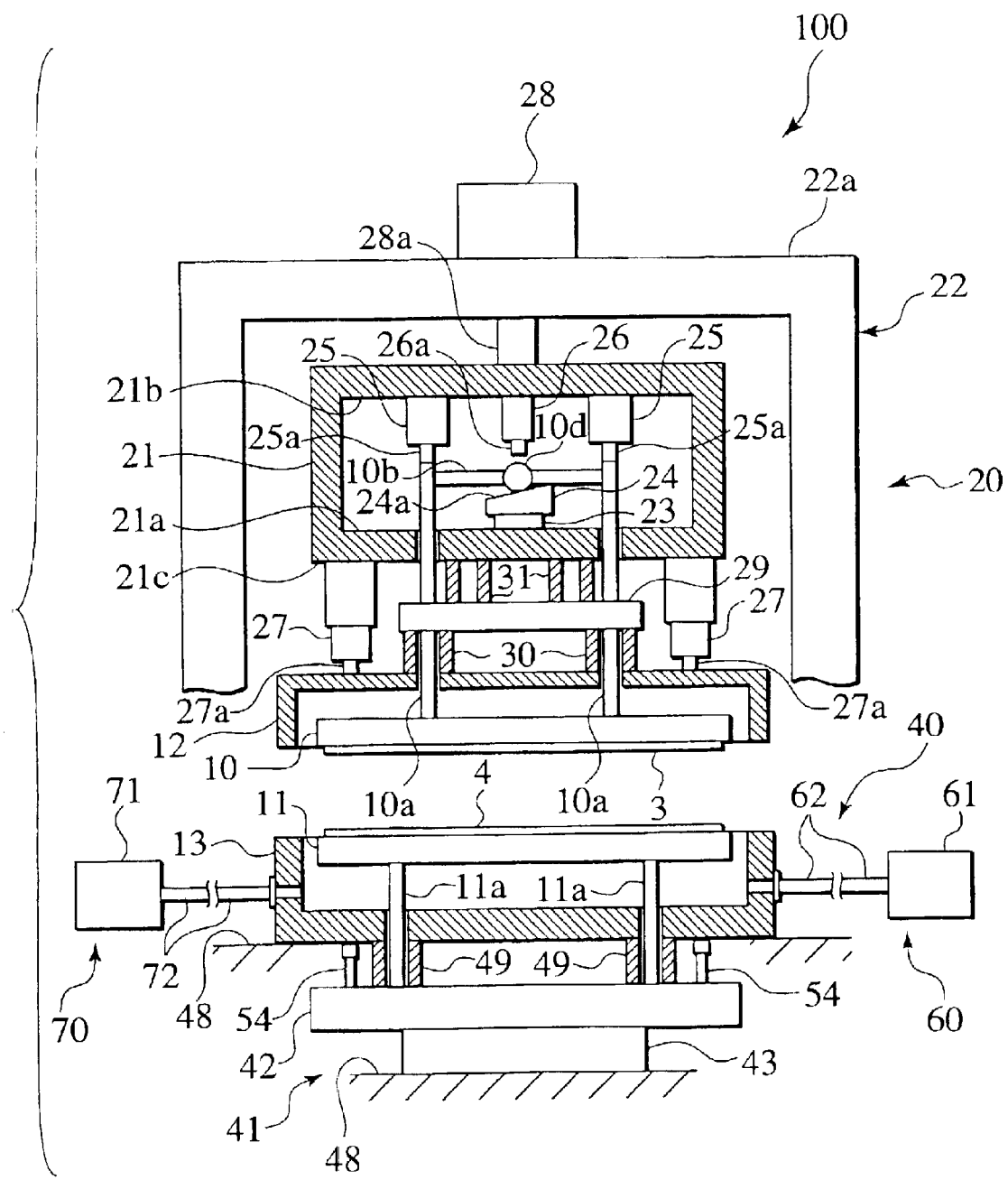
FIG. 5 is a partial sectional front view showing a constitution of a laminating apparatus of the present invention.

FIG. 5 is a partial sectional front view showing a constitution of a substrate laminating apparatus of the present invention.

A substrate laminating apparatus 100 comprises an upper structure 20, a lower structure 40, a decompressing device 60, and a compressing device 70.

The upper structure 20 includes an upper retention head 10 for holding an upper glass substrate 3, a chamber top lid 12 disposed to cover the upper retention head 10 from above, a frame body 21 for supporting the upper retention head 10 and the chamber top lid 12 so as to move vertically, and a supporting frame 22 for supporting the frame body 21 so as to move vertically.

The upper retention head 10 has a pair of supports 10a as couple members fixed to the upper surface. An upper part of each of the supports 10a is protruded into the frame body 21 through a through-hole provided in the frame body 21. A horizontal beam 10b is bridged and fixed on upper parts of the pair of supports 10a protruded into the frame body 21. A cam follower 10d is rotatably provided on the horizontal beam 10b. The cam follower 10d is abutted on a lift cam 24 used as a cam member provided so as to slide by a not-shown guide mechanism. The lift cam 24 is disposed on a bottom surface 21a in the frame body 21 through a load detector (detector) 23. The lift cam 24 has an upper surface formed in a slope 24a of a predetermined angle, and functions as an elevating device for vertically moving the cam follower 10d abutted on the slope 24a by moving back and forth in shown left and right directions by a not-shown drive unit such as a ball screw mechanism, accordingly moving the upper retention head 10. Also, the lift cam 24 and the cam follower 10d function as locking devices.

Upper ends of the pair of supports 10a are coupled to operation rods 25a, 25a of a pair of air cylinders 25, 25 used as lifting force application device fixed to a ceiling surface 21b of the frame body 21. The air cylinders 25, 25 can cancel a dead weight of the upper retention head 10 by supplying compressed air having enough pressure for generating a lifting force balancing with the dead weight of the upper retention head 10. In this case, a load based on a difference between the dead weight of the upper retention head 10 and the lifting force of the air cylinders 25, 25 can be detected by the load detector 23.

In a position of the ceiling surface 21b of the frame body 21 corresponding to the cam follower 10d, the air cylinder 26 used as a pressing force application device is disposed so that its operation rod 26a is directed downward, and the operation rod 26a can be abutted on the cam follower 10d. Thus, when the cam follower 10d moves apart from the lift cam 24, the air cylinder 26 can apply a pressing force through the cam follower 10d to the upper retention head 10. Additionally, since the pressing force by the air cylinder 26 can be detected by the load detector while the cam follower 10d is abutted on the lift cam, in this state, a pressing force of a predetermined amount can be applied to the upper retention head 10 by presetting an amount of a pressing force applied by the air cylinder 26 based on a detection value of the load detector 23.

An example of the setting method will be described.

That is, an amount of pressure of compressed air supplied to the air cylinder 25 is adjusted so that a load obtained from a detection result of the load detector 23 becomes "0", and set, for example, in a storage section of a later-described control unit 80. Accordingly, the dead weight of the upper retention head 10 is canceled. Then, the air cylinder 26 is operated while this state is maintained, the amount of the pressure of the compressed air supplied to the air cylinder 26 is adjusted so that the load obtained from the detection result of the load detector 23 is equal to a target pressing force (pressing force applied to the upper retention head 10), and set, for example, in the storage section of the later-described control unit 80. Thus, when the upper glass substrate 3 is abutted on the lower glass substrate 4 through the sealing material 5, and the cam follower 10d is moved apart from the lift cam 24, the target pressing force is applied to the upper retention head 10. In FIG. 5, the load detector 23 is constituted to always receive a load equivalent to a dead weight w of the lift cam 24 and the guide mechanism of the lift cam 24. The load equivalent to the dead weight w is preset as a correction value for the detection result of the load detector 23. A load obtained from a detection result in a state of receiving only the dead weight w is regarded as "0".

The chamber top lid 12 is coupled to operation rods 27a of a pair of elevation air cylinders 27 provided in a bottom surface of the frame body 21, and vertically moved by operations of the air cylinders 27. The chamber top lid 12 has holes larger in diameter than the support 10a at a position corresponding to the support 10a of the upper retention head 10, and allows relative movements of the upper retention head 10 in upper and lower directions by inserting the supports 10a into the holes.

The frame body 21 is coupled to an operation rod 28a of an elevation air cylinder 28 fixed to a horizontal part 22a of an upper end of the supporting frame 22.

A flat plate 29 is fixed in the area of the pair of supports 10a between the chamber top lid 12 and the frame body 21. Between the flat plate 29 and the chamber upper lid 12, a cylindrical elastic member (air-tight member) 30 is disposed to envelop each support 10a. A flange part of an upper end of the elastic member 30 is tightly fixed to the flat plate 29, and a flange part of a lower end thereof is tightly fixed to the chamber top lid 12. The elastic member 30 maintains air-tight sealing between the inside of a hermetically sealed chamber as a hermetically sealed container constituted of the chamber top lid 12 and a chamber bottom lid of later-described lower structure 40 and the outside. The elastic member 30 is elastically deformed to allow relative movements of the upper retention head 10 and the chamber top lid 12 in upper and lower directions.

Between the flat plate 29 and the frame body 21, cylindrical elastic members 31 equal in number to the elastic members 30 and equal in diameter (sectional area) to the elastic members 30 are disposed in a manner that a flange part of an upper end of each thereof is tightly fixed to a bottom surface 21c of the frame body 21, and a flange part of a lower end is tightly fixed to the flat plate 29. An internal space of this elastic member 31 communicates with an inner space of the chamber top lid 12 by a not shown communication tube. According to this constitution, when pressure is reduced in the hermetically sealed chamber constituted of the chamber top lid 12 and a bottom lid 13 of the lower structure 40, the elastic member 31 is set in a similar pressure-reduced state inside to be contracted. As a result, the elastic member 31 works as a reaction force application device for canceling a force for depressing the upper retention head 10. Here, the depressing force is generated by the elastic member 30 similarly contracted when pressure is reduced in the hermetically sealed chamber.

The lower structure 40 includes a lower retention head 11 for holding the lower glass substrate 4, the chamber bottom lid 13 fitted together with the chamber top lid 12 to constitute the hermetically sealed chamber, and a moving device 41 for the lower retention head 11.

The lower retention head 11 is supported on a movable table 42 of the moving device 41 through supports 11a.

The chamber bottom lid 13 is disposed to be fixed to a base 48. The chamber bottom lid 13 has holes larger in diameter than the supports 11a in order to pass the supports 11a therethrough. The holes allow horizontal movements of the supports 11a.

Between the chamber bottom lid 13 and a movable table 42, a cylindrical elastic member 49 is disposed to envelop the support 11a. In this case, a flange part of an upper end of the elastic member 49 is tightly fixed to the chamber bottom lid 13, and a flange part of a lower end thereof is tightly fixed to the movable stage 42. The elastic member 49 maintains air-tight sealing between the inside of the hermetically sealed chamber constituted of the chamber top lid 12 and the chamber bottom lid 13 and the outside. The elastic member 49 is elastically deformed to allow relative movements of the lower retention head 11 and the chamber bottom lid 13 in a horizontal direction.

The movable table 42 is loaded on the movable stage 43 disposed to be fixed on the base 48. An operation of the movable stage 43 enables movement of the movable table 42 in an X direction, a Y direction and a rotational (θ) direction.

On the movable table 42, a camera 54 for imaging a position detection mark attached to each of the glass substrates 3, 4 is disposed in a position corresponding to each corner of the upper and lower glass substrates 3, 4 held by the upper and lower retention heads 10, 11. Though not shown, portions of the lower retention head 11 and the chamber bottom lid 13 corresponding to the camera are made of transparent plates such as quartz glass. Through the transparent plates, the position detecting marks of the upper glass substrate 3 held by the upper retention head 10 and the lower glass substrate 4 held by the lower retention head 11 can be imaged.

The decompressing device 60 includes a vacuum source 61, and a communication tube 62 for communicating the vacuum source 61 and the chamber bottom lid 13 with each other.

The compressing device 70 includes a gas supply source 71 for supplying nitrogen gas, and a communication tube 72 for communicating the gas supply source 71 and the chamber bottom lid 13.

Figure 6:
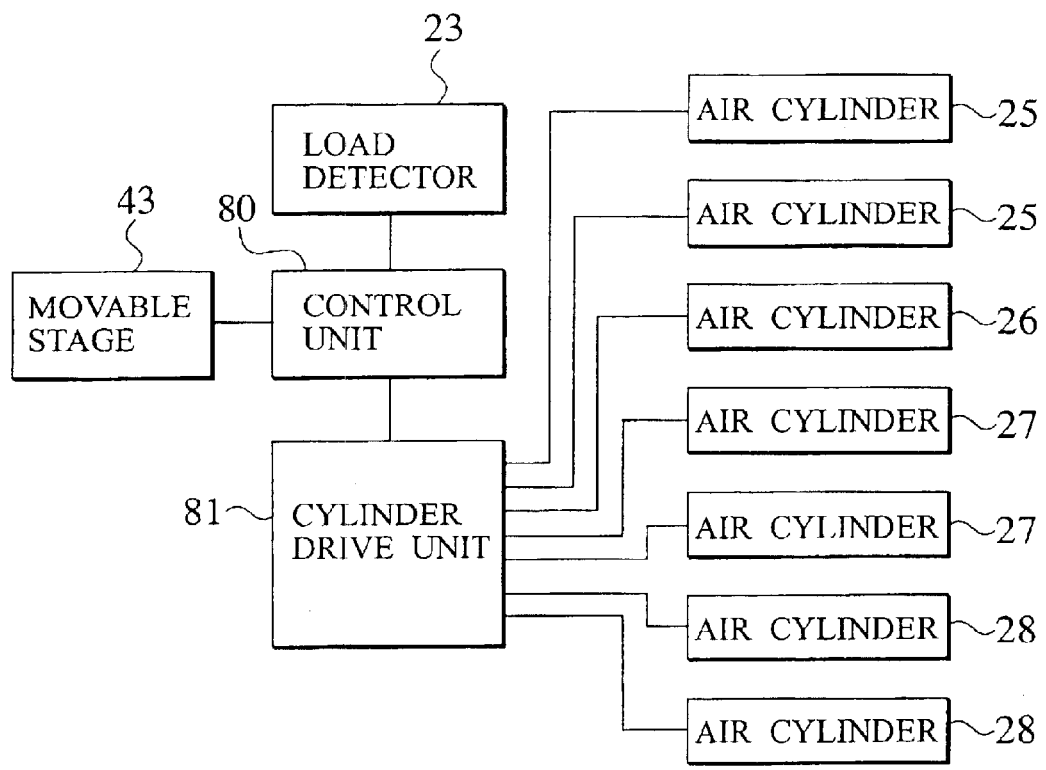
FIG. 6 is a block diagram showing a configuration of a control system of the laminating apparatus shown in FIG. 5.

As shown in FIG. 6, the laminating apparatus 100 includes the control unit 80. This control unit 80 is coupled through a cylinder drive unit 81 to each of the air cylinders 25, 26, 27, 28, the movable stage 43 and the load detector 23.

Next, an operation will be described.

Figure 7:
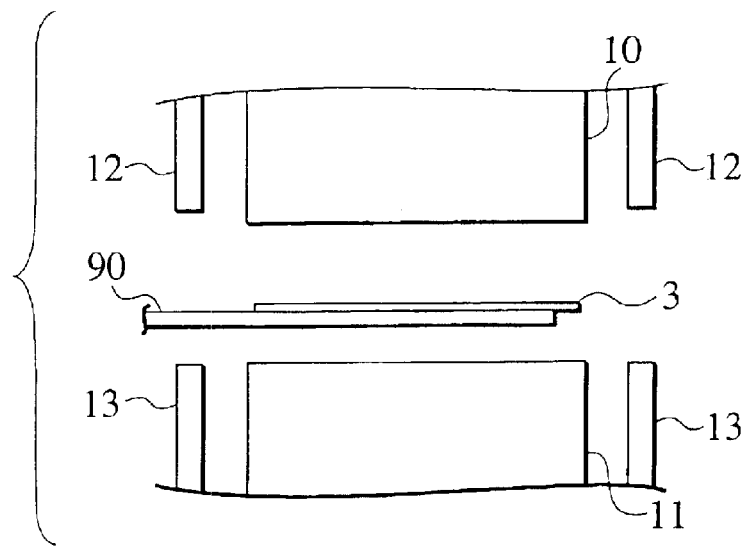
FIG. 7 is a schematic view showing a laminating process carried out by the laminating apparatus of FIG. 5.
Figure 8:
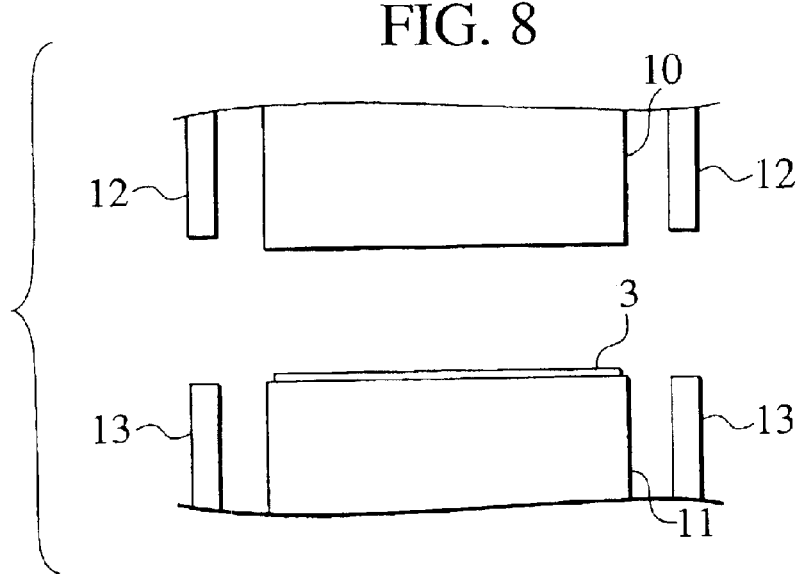
FIG. 8 is a schematic view showing the laminating process by the laminating apparatus of FIG. 5.
Figure 9:
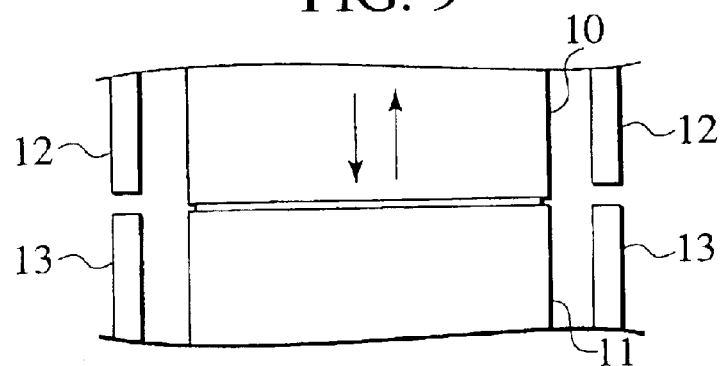
FIG. 9 is a schematic view showing the laminating process by the laminating apparatus of FIG. 5.
Figure 10:
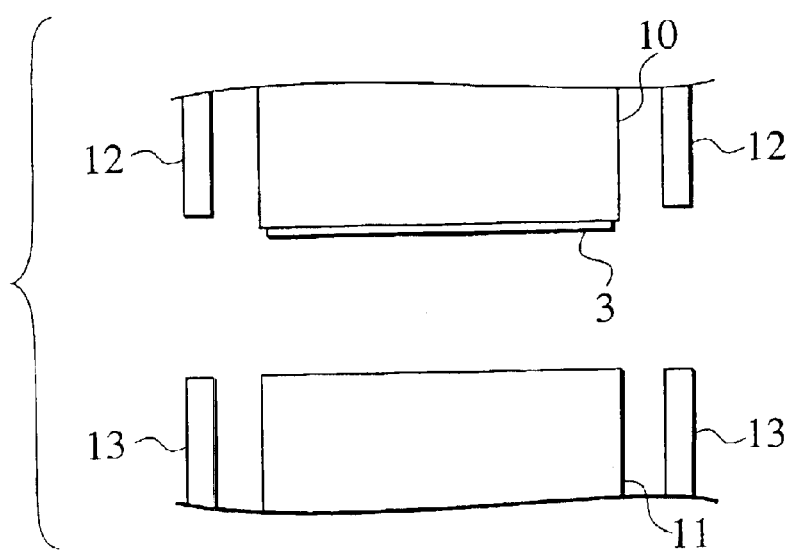
FIG. 10 is a schematic view showing the laminating process by the laminating apparatus of FIG. 5.

First as shown in FIG. 7, the upper glass substrate 3 is fed onto the lower retention head 11 by a feed arm 90 for conveying the glass substrates 3, 4 from a previous process. At this time, for example, a not-shown lift pin is protruded from the upper surface of the lower retention head 11 to temporarily hold the fed-in upper glass substrate 3. After the evasion of the feed arm 90, the lift pin is lowered, and the upper glass substrate 3 is placed on the lower retention head 11 (FIG. 8). Then, the operations of the elevation air cylinder 28 and the lift cam 24 lower the upper retention head 10 to a height for contact with the upper glass substrate 3 held on the lower retention head 11, and the upper retention head 10 adsorbs and holds the upper glass substrate 3 (FIG. 9). Incidentally, as a retention method of the upper glass substrate 3 by the upper retention head 10, for example, a retention method by an electrostatic chuck. Subsequently, the upper retention head 10 rises while holding the upper glass substrate (FIG. 10). At this time, the not-shown lift pin rises again.

Figure 11:
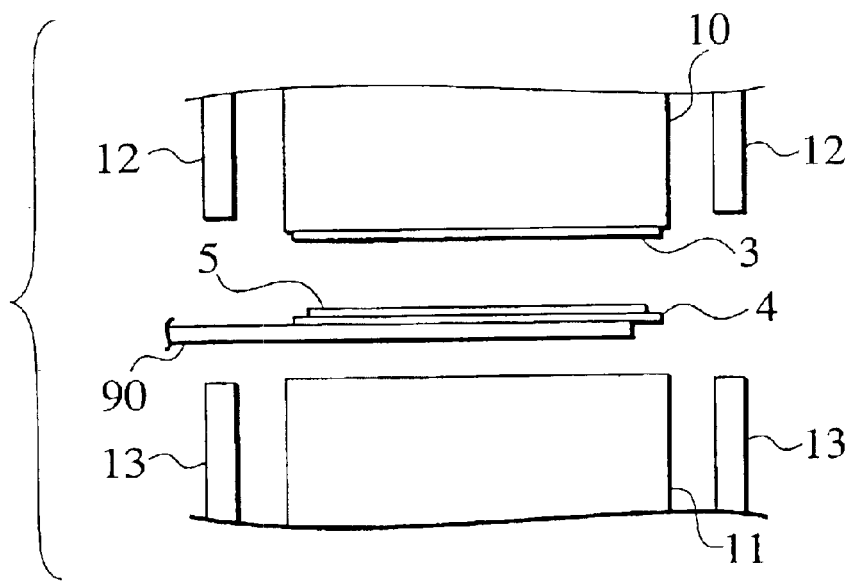
FIG. 11 is a schematic view showing the laminating process by the laminating apparatus of FIG. 5.

Then, the feed arm 90 feeds the lower glass substrate 4 in (FIG. 11). As in the conventional case, the sealing material 5 as an adhesive is applied on the lower glass substrate 4, and a predetermined amount of liquid crystal is dripped on the inner side of the sealing material. Then, the feed arm 90 evades by leaving a lower glass substrate 4 on the lift pins.

Subsequently, the lift pin is lowered, and the lower glass substrate 4 is retained by the lower retention head 11. Also here, as a retention method of the lower glass substrate 4 by the lower retention head 11, the retention method by the electrostatic chuck can be used.

Then, alignment is carried out for both glass substrates 3, 4.

First, the air cylinder 28 is actuated to lower the upper retention head 10 to a position where the upper glass substrate 3 approaches the lower glass substrate 4. That is, an elevation stroke of the air cylinder 28 is adjusted so that the upper retention head 10 can be moved between a waiting position for forming a space for feeding each of the glass substrates 3, 4 by the feed arm 90 between the upper retention head 10 and the lower retention head 11 and an aligning position for aligning the upper glass substrate 3 and the lower glass substrate 4.

Figure 12:
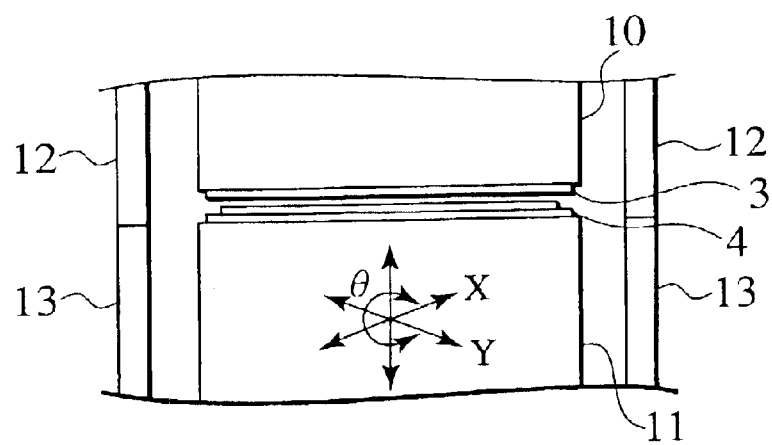
FIG. 12 is a schematic view showing the laminating process by the laminating apparatus of FIG. 5.

Then, the air cylinder 27 is actuated to further lower the chamber top lid 12 with respect to the upper retention head 10, and bring the tip of the chamber top lib 12 into contact-with the upper end of the chamber bottom lid 13. The chamber top lid 12 and the chamber bottom lid 13 constitute a hermetically sealed chamber (FIG. 12).

Then, pressure is reduced in the hermetically sealed chamber constituted of the chamber top lid 12 and the chamber bottom lid 13 by the decompressing device 60. When it is verified that a degree of vacuum has reached a prescribed value, alignment is started. This alignment is carried out by imaging the position detection marks provided on the glass substrates 3, 4 by the camera 54, and carrying out image-processing of obtained image data. Then, based on a detected state of deviation in alignment between the upper glass substrate 3 and the lower glass substrate 4, the lower retention head 11 is moved in X–Y–θ directions if required, to move the lower glass substrate 4. According to this embodiment, a permissible range of a state of deviation in alignment is preset, the state of deviation in alignment is detected again after the alignment, and the alignment is repeated by moving the lower retention head 11 until the state of deviation in alignment comes into the permissible range.

Thus, after the end of the alignment, the lift cam 24 is moved in a shown right direction by the not-shown drive unit to further lower the upper retention head 10, and the upper glass substrate 3 is abutted on the lower glass substrate 4 through the sealing material 5. At this time, in order to cancel the dead weight of the upper retention head 10, compressed air with pressure for generating a lifting force of an amount balancing with the dead weight of the upper retention head 10 is supplied through the cylinder drive unit 81 to the air cylinders 25, 25. Also, compressed air of pressure for applying a small pressing force necessary for lowering the cam follower 10d along the slope 24a of the lift cam 24 is supplied to the air cylinder 26.

Figure 13:
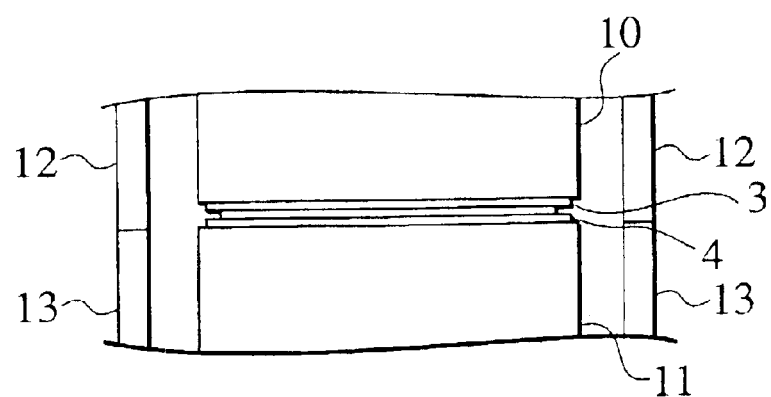
FIG. 13 is a schematic view showing the laminating process by the laminating apparatus of FIG. 5.

Subsequently, the lift cam 24 is further moved in the right direction to move the cam follower 10d apart from the slope 24a of the lift cam 24. Then, air with the pressure set by a timing of moving the cam follower 10d apart from the slope 24a of the lift cam 24 is supplied to the air cylinder 26, whereby a necessary pressing force is applied to the upper glass substrate 3 and the lower glass substrate 4. Accordingly, the glass substrates 3, 4 are laminated together through the sealing material 5 in a sealed-in state of the liquid crystal 6 (FIG. 13). In this case, at a point of time when the cam follower 10d is moved apart from the lift cam 24, a load detected by the load detector 23 is changed from a load equivalent to the pressing force of the air cylinder 26 to "0". Therefore, the timing for moving the cam follower 10d apart from the lift cam 24 can be obtained by monitoring a detection value of the load detector 23.

If the state of deviation in alignment between the two glass substrates is detected again by the camera 54 after the end of the laminating and the deviation exceeds the permissible value, the deviation in alignment is eliminated by moving the lower retention head 11. Thus, the deviation in alignment caused during the laminating can be eliminated.

Now, after the end of the laminating in the aforementioned manner, in a state shown in FIG. 13, nitrogen gas is injected into the hermetically sealed chamber to return to the atmospheric pressure by the compressing device 70. The return to the atmospheric pressure by the injection of the nitrogen gas can prevent dew condensation generated when an atmosphere is injected in place of nitrogen.

After the return to the atmospheric pressure in the hermetically sealed chamber, the retention of the glass substrates 3, 4 by the upper retention head 10 and the lower retention head 11 are released.

Figure 14:
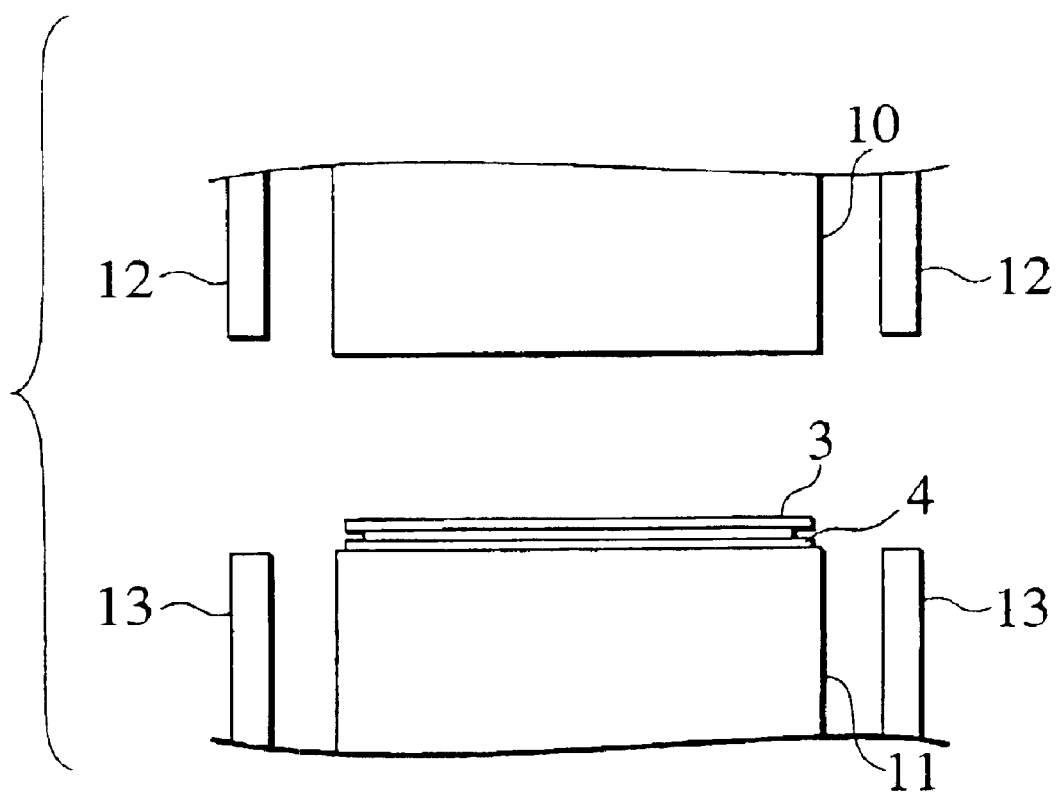
FIG. 14 is a schematic view showing the laminating process by the laminating apparatus of FIG. 5.

Then, the air cylinder 27 is actuated to raise the chamber top lid 12, the lift cam 24 is moved in a shown left direction by the not-shown drive unit, and the air cylinder 28 is actuated to raise the upper retention head 10. Accordingly, contact surfaces of the chamber top lid 12 and the chamber bottom lid 13 are also moved apart from each other to release the hermetically sealed chamber (FIG. 14).

Then, the lift pin (not shown) is raised, the glass substrates 3, 4 which have been laminated together are lifted from the upper surface of the lower retention head 11, and fed out to a next step by a feed arm similar to the feed arm 90.

According to the embodiment, when the upper glass substrate 3 held by the upper retention head 10 is abutted on the lower glass substrate 4 held by the lower retention head 11 through the sealing material 5, the lifting force is applied to the upper retention head 10 by the air cylinder 25 to cancel the dead weight of the upper retention head 10. Thus, even if the upper retention head 10 is heavy, impact forces applied to the glass substrates 3, 4 in abutment can be reduced compared with the case of abutting the upper glass substrate 3 on the lower glass substrate 4 while the dead weight of the upper retention head 10 is applied. As a result, it is possible to prevent damaging of the glass substrates 3, 4 caused by application of large impacts on the glass substrates 3, 4 when they are laminated together, and thereby improve yield.

Since the predetermined pressing force is applied to the upper retention head 10 by the air cylinder 26 while the lifting force is applied to the upper retention head 10 by the air cylinder 25 to cancel the dead weight of the upper retention head 10, the pressing force for laminating the glass substrates 3, 4 can be managed only by the pressing force of the air cylinder 26. It is thus possible to easily and accurately adjust the pressing force for laminating the glass substrates 3, 4.

Since the pressing force of the air cylinder 26 is detected by use of the load detector 23, and the compressed air pressure supplied to the air cylinder 26 can be adjusted so as to obtain a predetermined pressing force at the control unit 80 based on the detection result, it is possible to adjust the pressing force of the glass substrates 3, 4 further accurately.

The elastic member 31 is provided between the flat plate 29 and the frame body 21. When the vacuum state is set in the hermetically sealed container, the inside of the elastic member 30 is similarly set to the vacuum state to be contracted, whereby the depressing force applied to the upper retention head 10 is canceled by setting the vacuum state in the elastic member 31 similarly to that of the hermetically sealed chamber to contract the same. Accordingly, even if the pressing force applying device (air cylinder 26) for applying the pressing force to the upper retention head 10 is disposed outside the hermetically sealed chamber, fluctuation in the pressing force of the upper retention head 10 due to the differential pressure between the inside of the hermetically sealed chamber and the outside can be prevented. As a result, it is possible to accurately apply a predetermined pressing force on the upper retention head 10. Additionally, in this case, since the inside of the elastic member 31 communicates with the inside of the hermetically sealed chamber, and pressure equal to that in the hermetically sealed chamber is set in the elastic member 31 following a pressure change in the hermetically sealed chamber, it is not necessary to provide the elastic member 31 with any special driving sources for applying reaction forces to the elastic member 30, and an advantage of simplifying the device constitution is obtained.

According to the embodiment, the elevating device including the lift cam 24 and the cam follower 10d is coupled through the support 10a to the upper retention head 10, the support 10a and chamber top lid 12 are coupled to each other by the elastic member 30 so as to be moved relatively. The movable table 42 of the moving device 41 is coupled through the support 11a to the lower retention head 11, and the support 11a and the chamber bottom lid 13 are coupled to each other by the elastic member 49. Thus, the elevating device and the movable stage 43 which easily become dust generation sources can be disposed outside the hermetically sealed chamber while maintaining tight-sealing of the hermetically sealed chamber. As a result, it is possible to prevent contamination of a vacuum atmosphere in the hermetically sealed chamber caused by jetting-out of gas contaminated with dust or the like from a drive mechanism such as the elevating device or the movable stage 43 when pressure is reduced in the hermetically sealed chamber, and to maintain high quality of the laminated glass substrates 3, 4.

Since the elevating device and the movable stage 43 which need relatively large arrangement spare can be disposed outside the hermetically sealed chamber, a volume of the hermetically sealed chamber (chamber top lid 12, chamber bottom lid 13) can be reduced as much as possible. Accordingly, time necessary for reducing pressure in the hermetically sealed chamber by the decompressing device 60 can be shortened. As a result, it is possible to improve productivity of the laminating apparatus 100.

The compressed air pressure of a proper amount is supplied to the air cylinder 26 to apply a small pressing force to the cam follower 10d in the period before the cam follower 10d is moved apart from the slope 24a of the lift cam 24. Accordingly, the timing for abutting the upper glass substrate 3 on the lower glass substrate 4 through the sealing material 5 can be detected by use of the load detector 23.

That is, the load corresponding to the pressing force of air cylinder 26 is detected from the load detector 23 in the period before the upper glass substrate 3 is abutted on the lower glass substrate 4 through a sealing material 5. However, after the upper glass substrate 3 is abutted on the lower glass substrate 4 through the sealing material 5 to move the cam follower 10d apart from the lift cam 24, the load obtained from the detection result of the load detector 23 is changed to "0". A timing at which a change is made in the detection value can be obtained as a timing for the abutment between the glass substrates 3, 4. Thus, even if variance in thickness or the like of the glass substrates 3, 4 causes variance in timing for abutment of the upper glass substrate 3 on the lower glass substrate 4, it is possible to accurately grasp the timing for the abutment of the upper glass substrate 3 on the lower glass substrate 4 through the sealing material 5. As a result, for example, when a predetermined pressing force is applied from the point of time of the abutment of the glass substrates 3, 4, an application timing of the pressing force can be accurately controlled. Additionally, when the crushing amount of the sealing material 5 is managed based on the application time of the pressing force, the application time can be accurately managed. Especially, in the latter case, if an application state of the sealing material 5 is always constant, the sealing material 5 can be crushed always by a predetermined crushing amount. As a result, the glass substrates 3, 4 can be laminated together by a predetermined gap, and quality of a liquid crystal panel as an end product can be advantageously improved.

The embodiment has been described by way of example where the air cylinders 25, 25 apply the lifting force balancing with the dead weight of the upper retention head 10 to cancel the dead weight of the upper retention head 10 and, in this state, the air cylinder 26 applies the predetermined pressing force to the upper retention head 10. However, the invention is not limited to this example. For example, in the laminating apparatus 100 of FIG. 5, without providing the air cylinder 26, by adjusting the lifting force of the air cylinders 25, 25 to a value smaller than that of the lifting force equivalent to the dead weight of the upper retention head 10, a pressing force based on a difference between the lifting force of the air cylinders 25, 25 and the dead weight of the upper retention head 10 may be applied to the upper retention head 10. In this case, by adjusting and setting the amount of the pressure of the compressed air applied to the air cylinders 25, 25 beforehand so that the load detected by the load detector 23 can become a predetermined value (pressing force of an amount necessary for laminating), the predetermined pressing force can be accurately applied to the upper retention head 10. Also, by changing the pressure of the compressed air applied to the air cylinders 25, 25 so as to control it to the amount for generating the lifting force balancing with the dead weight of the upper retention head 10 until the upper glass substrate 3 is abutted on the lower glass substrate 4 through the sealing material 5, and control it to the amount preset by use of the load detector 23 after the abutment, impacts applied to the glass substrates 3, 4 in abutment can be reduced. Also in this case, by setting a lifting force of the air cylinders 25, 25 to a value slightly smaller than the lifting force equivalent to the dead weight of the upper retention head 10 in the period until the cam follower 10d is moved apart from the slope 24a of the lift cam 24, the cam follower 10d can be smoothly lowered along the slope 24a of the lift cam 24 during the movement of the lift cam 24. Based on the changing of the detection value of the load detector 23, a timing at which the upper glass substrate 3 is abutted on the lower glass substrate 4 through the sealing material 5 can be known.

For example, if the upper retention head 10 is constituted of a heavy article, the air cylinders 25, 25 capable of obtaining high outputs need be used. However, generally, control of a minute output (lifting force) becomes more difficult as an output of the air cylinder is larger. Thus, in such a case, the air cylinders 25, 25 apply a lifting force A of an amount close to the dead weight of the upper retention head 10, and the air cylinder 26 applies a pressing force (C-(B-A)) of an amount obtained by subtracting a pressing force of a difference between the dead weight B of the upper retention head 10 and the lifting force A of the air cylinders 25, 25 from a pressing force C necessary for laminating. In this case, since the air cylinder 26 needs only an output for applying the pressing force of the aforementioned difference, an air cylinder of a smaller output compared with that of the air cylinder 25 can be used, and it is possible to control the output relatively minutely. In this way, the pressing force of the aforementioned difference can be accurately applied by use of the air cylinder 26, and the pressing force applied on the upper retention head 10 can be accurately controlled. Even if the upper retention head 10 constituted of the heavy article is used, the pressing force for laminating can be accurately applied. Also in this case, by setting the lifting force A of the air cylinders 25, 25 to a larger value than the dead weight B of the upper retention head 10, and while controlling an amount of the pressure of the compressed air supplied to the air cylinder 26, the dead weight of the upper retention head 10 is canceled in the period until the upper glass substrate 3 is abutted on the lower glass substrate 4 through the sealing material 5. By controlling so as to apply the predetermined pressing force C to the upper retention head 10 after the abutment, it is possible to reduce impacts applied to the glass substrates 3, 4 in abutment. Moreover, the air cylinder 26 applies a small pressing force to the cam follower 10d in the period until the cam follower 10d is moved apart from the slope 24a of the lift cam 24. Accordingly, the cam follower 10d can be smoothly lowered along the slope 24a of the lift cam 24 during the movement of the lift cam 24, and the timing of abutting the upper glass substrate 3 on the lower glass substrate 4 through the sealing material 5 can be detected based on the changing of the detection value of the load detector 23.

Additionally, if a pressing force applied to the glass substrates 3, 4 is relatively small in laminating, the upper glass substrate 3 is abut on the lower glass substrate 4 though the seal material, and there is no possibility of damaging the glass substrates 3, 4 even if the pressing force necessary for laminating is applied, the pressing force of the air cylinder 26 can be applied before the cam follower 10d is moved apart from the lift cam 24. In this case, there is an advantage that predetermined pressing forces can be immediately applied to both glass substrates 3, 4 at a point of time when the cam follower 10d is moved apart from the lift cam 24.

A force for canceling the force of depressing the upper retention head 10 applied by the elastic member 30 when pressure is reduced in the hermetically sealed chamber may be applied by use of another driving source such as an air cylinder in place of the elastic member 31.

Regarding the control of the air cylinder 26 during the laminating operation of the glass substrates 3, 4, not only control for applying a fixed pressing force to the upper retention head 10 but also control for changing a pressing force in multiple stages or every moment can be carried out.

The description has been made by way of example where the load detector 23 is provided between the lift cam 24 and the frame body 21. However, the load detector 23 can be set in any positions as long as it can detect a pressing force applied to the upper retention head 10.

The description has been made by way of example where the glass substrates 3, 4 are used as substrates. However, other materials such as resin substrates can be used.

Further, the description has been made by way of example where the dead weight of the upper retention head 10 is canceled by use of the air cylinders 25, 25. In place of the upper retention head 10, the lower retention head 11 may be provided with a mechanism for canceling the dead weight. The upper retention head 10 and the lower retention head 11 both may be provided with mechanisms for canceling the dead weight.

The invention is not limited to the abutment or press of the upper glass substrate 3 and the lower glass substrate 4 through the sealing material 5 by moving up and down the upper retention head 10. The aforementioned operation may be carried out by moving up and down the lower retention head 11. The upper retention head 10 and the lower retention head 11 both may be moved up and down.

The lifting force of the upper retention head 10 by the air cylinders (lifting force application devices) 25, 25 may be applied during the laminating operation or at a point of time when the alignment of the glass substrates 3, 4 is completed. Additionally, even during the lowering of the retention head 10 for holding the upper glass substrate 3 thereon, by use of the air cylinders (lifting force application devices) 25, 25 to apply the lifting force to the upper retention head 10 thereby canceling the dead weight of the upper retention head 10, it is possible to prevent the damaging of the upper glass substrate 3 when the upper glass substrate 3 is held by the upper retention head 10.

The dead weight canceled by the air cylinders 25, 25 has been described as the dead weight of the upper retention head 10, for convenience. However, actually, the operation rods 25a, 25a of the air cylinders 25, 25 support dead weights of members (support 10a, beam 10b, cam follower 10d, flat plate 29 etc.) in addition to that of the upper retention head 10. Thus, by adjusting the lifting force of the air cylinders 25, 25 so as to cancel the dead weights of these members, it is possible to reduce impacts more when the upper glass substrate 3 is abutted on the lower glass substrate 4 through the sealing material 5.

The adhesive is not limited to the adhesive having sealing. An adhesive having no sealing can be used.

According to the present invention, since impact forces applied to the upper substrate and the lower substrate during the laminating can be reduced, the damaging of the substrates can be prevented. Thus, it is possible to improve yield.

What is claimed is:

1. A substrate laminating apparatus, comprising:
    an upper retention head configured to hold an upper substrate;
    a lower retention head configured to hold a lower substrate and disposed facing the upper retention head, the upper and lower retention heads configured to laminate the upper and lower substrates to interpose adhesive therebetween by allowing the lower and upper retention heads to be close to each other relatively;
    an elevating device configured to relatively move the upper retention head and the lower retention head in upper and lower directions;
    a lifting force application device configured to apply a lifting force to one of the upper retention head and the lower retention head when the upper substrate and the lower substrate are abutted against each other through the adhesive by the elevating device; and
    a control unit configured to control the lifting force application device to cancel a dead weight of the upper retention head with the lifting force.

2. A substrate laminating apparatus, comprising:
    an upper retention head configured to hold an upper substrate;
    a lower retention head configured to hold a lower substrate and disposed facing the upper retention head, the upper and lower retention head configured to laminate the upper and lower substrates so as to interpose adhesive therebetween by allowing the lower and upper retention heads to be close to each other relatively;
    an elevating device configured to vertically move the upper retention head;
    a lifting force application device configured to apply a lifting force to the upper retention head when the upper substrate and the lower substrate are abutted against each other through the adhesive by the elevating device; and
    a control unit configured to control the lifting force application device to cancel a dead weight of the upper retention head with the lifting force.

3. The substrate laminating apparatus according to claim 2, further comprising:
    a locking device configured to prevent the upper retention head from moving in a lower direction when the lifting force of the lifting force application device is smaller than a dead weight of the upper retention head,
    wherein the locking device is configured to release a locked state when the upper substrate is abutted on the lower substrate through the adhesive.

4. The laminating apparatus according to claim 2, further comprising:
    a pressing force application device configured to apply a pressing force in a lower direction to the upper retention head.

5. The laminating apparatus according to claim 3, wherein the locking device comprises a cam member and a cam follower coupled to the upper retention head and abutted on the cam member.

6. The laminating apparatus according to claim 4, further comprising:
    a detector configured to detect the pressing force applied to the upper retention head by the pressing force application device,
    wherein the control unit is configured to control the pressing force applied to the upper retention head by use of the pressing force application device based on a result of the detector.

7. The laminating apparatus according to claim 2, further comprising:
    a hermetically sealed container configured to envelop the upper retention head and the lower retention head so that the upper retention head and the lower retention head can move apart from the elevating device;
    a couple member configured to couple the elevating device to the upper retention head;
    an elastically deformable air-tight member configured to maintain tight-sealing between the hermetically sealed container and the couple member while allowing relative movements of the hermetically sealed container and the couple member; and a reaction force application device configured to apply, to the upper retention head, a force for canceling a depressing force applied on the upper retention head due to elastic deformation of the air-tight member based on differential pressure between the inside of the hermetically sealed container and an outside when a pressure change occurs in the hermetically sealed container.

8. The laminating apparatus according to claim 2, further comprising:

a detector configured to detect a load applied to the upper retention head based on a difference between the dead weight of the upper retention head and the lifting force of the lifting force application device, wherein the control unit is configured to control the lifting force application device based on a result of the detector.

* * * * *